Nov. 7, 1961  H. F. COX, JR  3,007,608
LIQUID DISPENSING CONTAINERS
Filed July 25, 1956  6 Sheets-Sheet 1
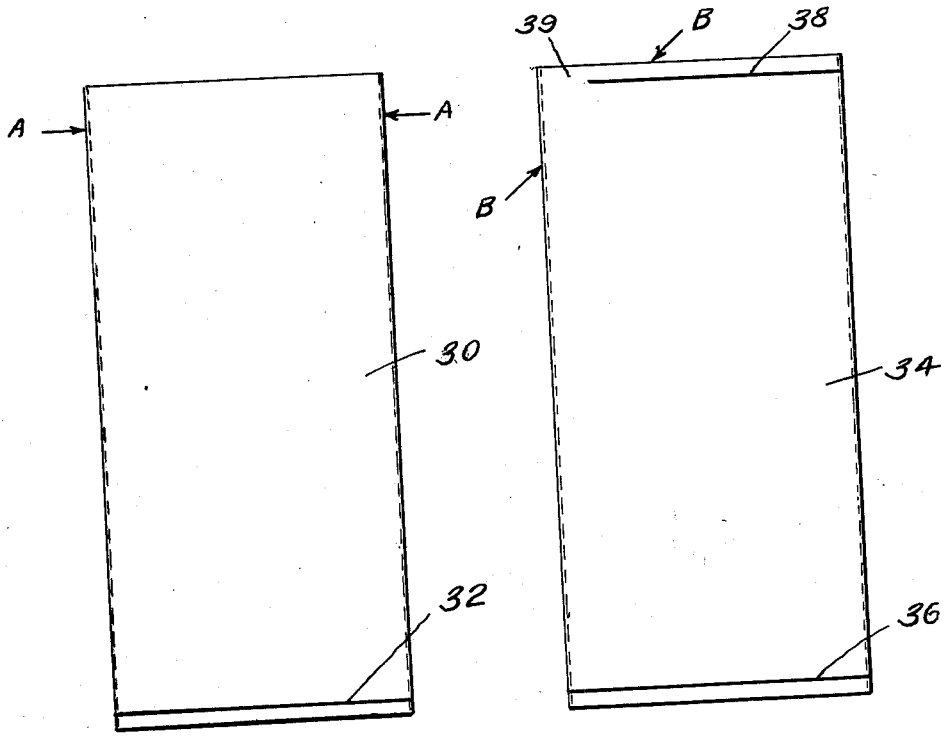
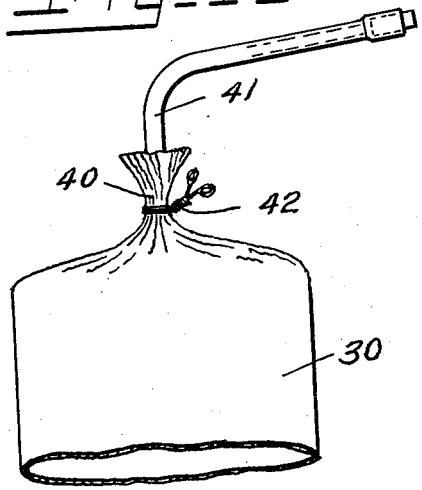
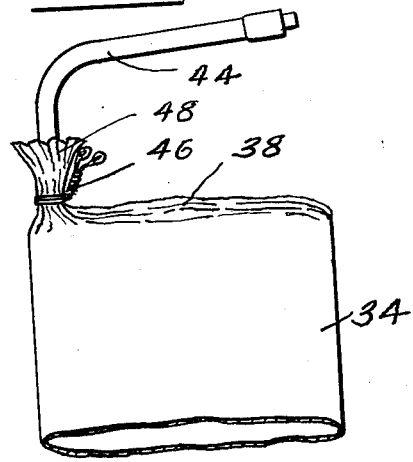
INVENTOR.
Herbert F. Cox Jr.
BY  F. P. Keeper
ATTORNEY.

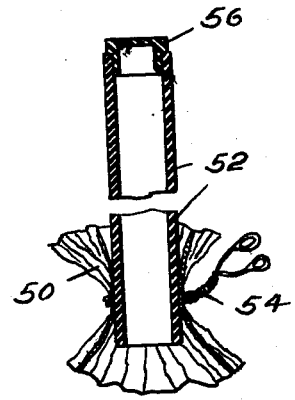
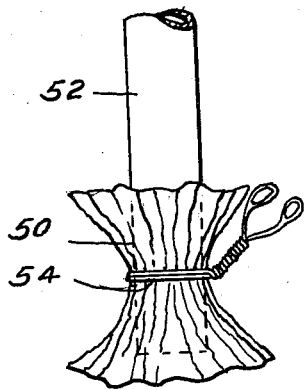
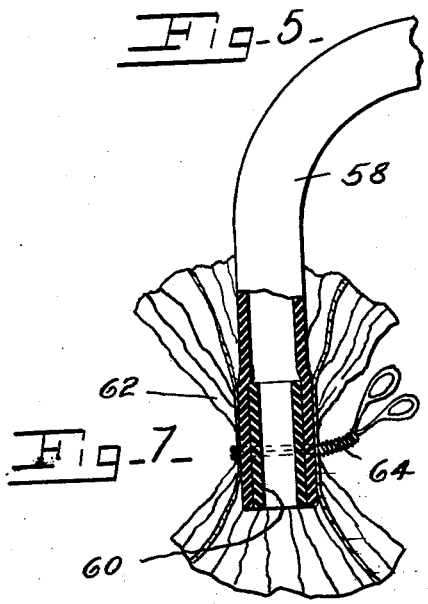
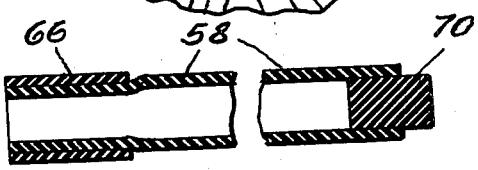
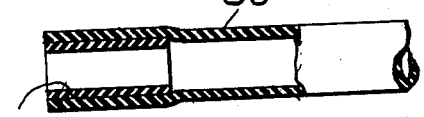
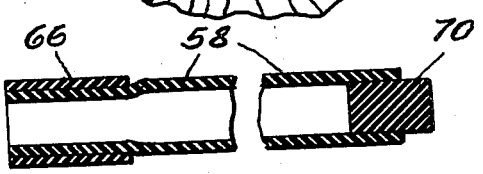
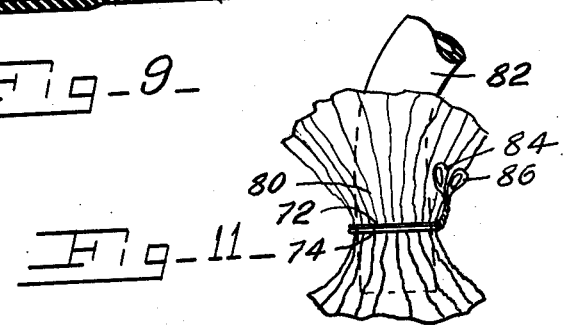

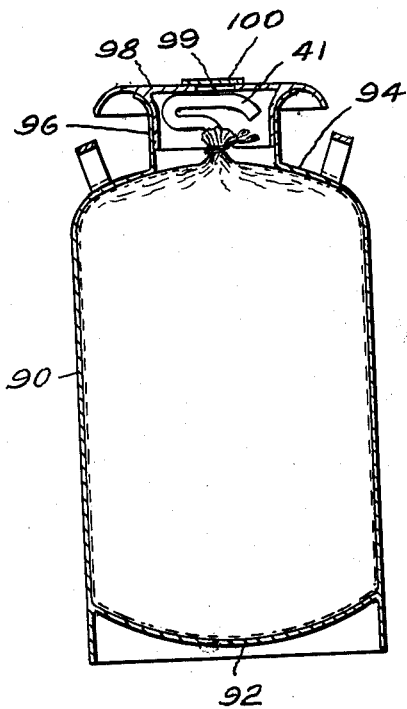
Fig_12_
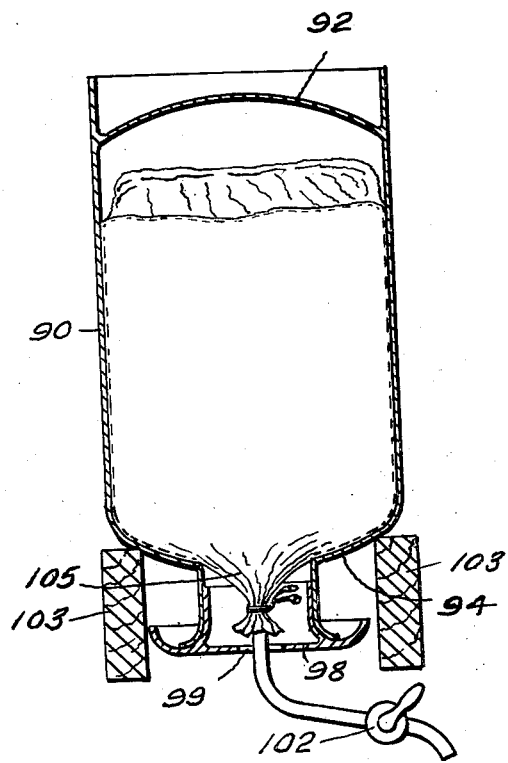
Fig_13_
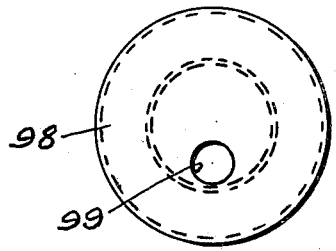
Fig_14_

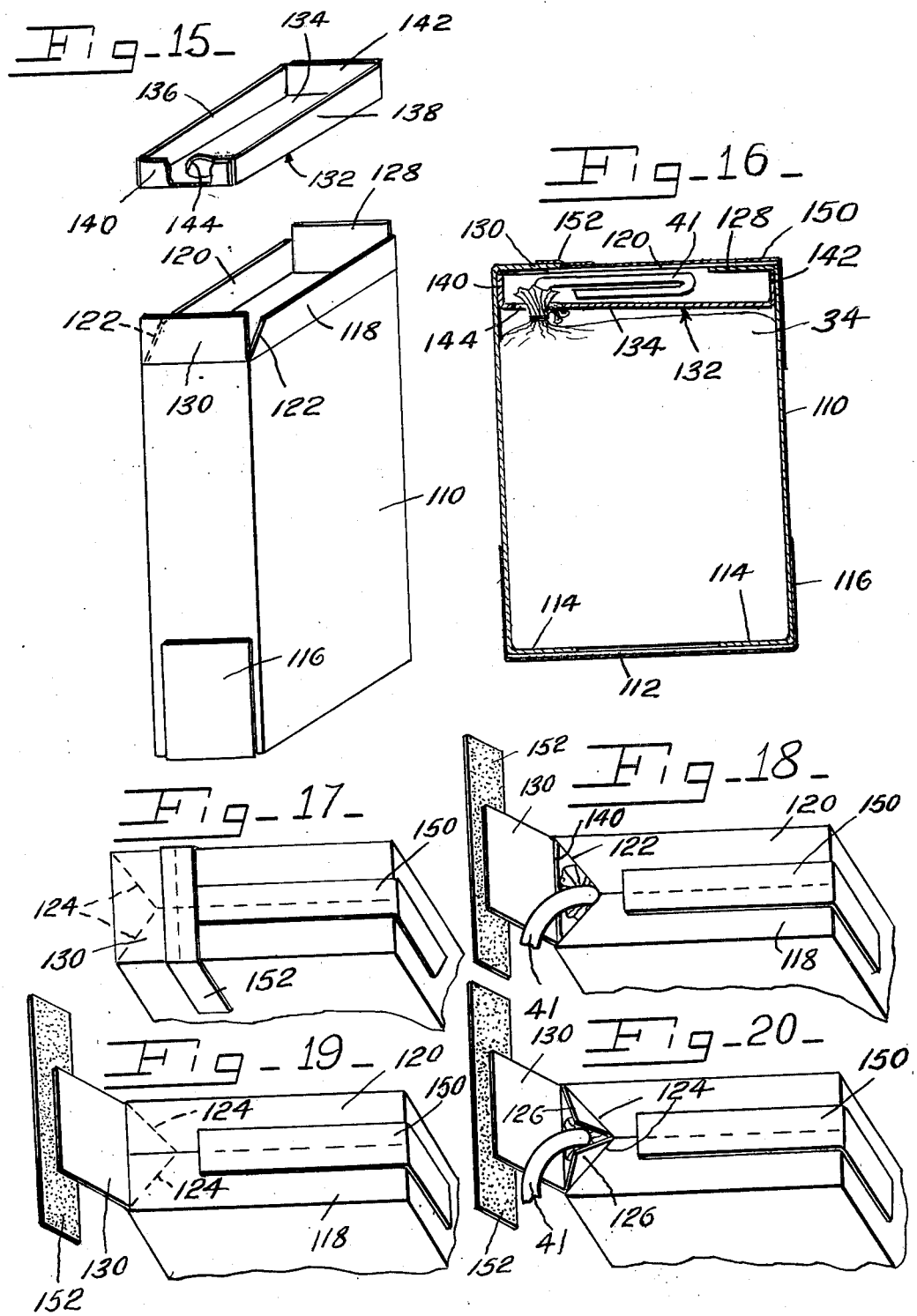

United States Patent Office 3,007,608
Patented Nov. 7, 1961

3,007,608
LIQUID DISPENSING CONTAINERS
Herbert F. Cox, Jr., 406 Sedgwick Drive, Syracuse, N.Y.
Filed July 25, 1956, Ser. No. 599,958
7 Claims. (Cl. 222—105)

This invention relates to liquid dispensing and shipping packages, and more particularly to such a package comprising a relatively rigid sustaining container, and a disposable thin plastic lining bag.

In the handling of milk, for example, it has long been the practice to employ tinned milk cans of sanitary construction, so that the cans can readily be cleaned and rendered sanitary for repeated reuse. Such cans after emptying are returned to the milk source for refilling, and it is the responsibility of the source of supply to see to it that the cans are sanitary before reuse, and independent inspection is required to assure that regulations and safe conditions are maintained. Such a can is relatively heavy, and in a three gallon or two gallon size equals in weight, the net contents, and the initial shipping cost as well as the return for refill are major items in the cost of milk distribution. Further such cans, in order to be free of corners, are required to be round, which renders such cans space consuming during storage and shipment. Further such cans afford no ready means for dispensing the contents thereof in fractional amounts as desired, and the remaining contents thereof during partial dispensing are subjected to air, which may be contaminated. While some cans have been provided with drain spouts at the bottom, from which fractional dispensing may be had, yet such spouts offer additional difficulties to assure sanitary conditions, and the can itself requires return shipment, and retinning from time to time. The weight thereof, and the fact that the contents during dispensing is subjected to contact with air are attendant disadvantages.

The present invention is directed to a dispensing package that may be disposed of after use, and which utilizes a liner adapted to protect the contents absolutely from air. The invention further is directed to the adaptation of the liner to relatively cheap inexpensive fiber cartons, or to the customary milk cans with no alteration except as to the milk can covers. When so applied to milk cans, the problem of sanitation or the corrosion of the tin plate is largely eliminated since the contents of the liner never touches the metal.

The invention is further directed to provision for readily filling the liner, which is in the form of an open, or partially open top bag, and is further directed to provision for simultaneously sealing the open top and applying a dispensing conduit directly to the bag material. The invention is further directed to providing means for sealing and attaching such a tube which requires a minimum of effort, and which can be effected by ordinary relatively unskilled labor, all with a minimum danger of contamination or the creation of unsanitary conditions, which in the case of milk, ice cream mix and the like, are important considerations.

The invention further is relatively simple in nature, and the parts utilized by the milk producer, or requiring attention by the ultimate consumer, are such that absolute protection is provided in so far as maintaining health standards are concerned. The invention, is also economical in so far as cost of materials are concerned, and in the case of fiber board containers, the net weight of the contents of a package is approximately that of the package and contents, and the package is of such a shape as to require a minimum of space, when stored in refrigeration compartments.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a side elevational view of a plastic tubular container, sealed across the bottom and ready for filling;

FIGURE 2 is a side elevational view of a modified plastic tubular container sealed across the bottom, and sealed part way across the top;

FIGURE 3 is a fragmentary side elevational view of the upper end of the container of FIGURE 1 after filling, with the open end gathered and sealed on a tubular outlet hose;

FIGURE 4 is a fragmentary side elevational view of the upper end of the container of FIGURE 2, after filling, with the open corner gathered and sealed on a tubular outlet hose;

FIGURE 5 is an enlarged fragmentary sectional view through the gathered hose connection as applied to a relatively rigid hose;

FIGURE 6 is an elevational fragmentary view of the connection of FIGURE 5;

FIGURE 7 is a sectional enlarged fragmentary view of the gathered hose connection, as applied to a flexible hose having a rigid internal sleeve;

FIGURE 8 is a sectional enlarged fragmentary view of the gathered hose connection as applied to a flexible hose having a rigid external sleeve;

FIGURE 9 is a further enlarged sectional view of the hose end treatment, as employed in FIGURE 7;

FIGURE 10 is a further enlarged sectional view of the hose end treatment, as employed in FIGURE 8;

FIGURE 11 is an enlarged fragmentary elevational view of the gathered material applied to an outlet hose as by wire banding;

FIGURE 12 is a sectional view through a milk can with the liner in place and filled and a hose connection applied;

FIGURE 13 is a sectional view showing the container of FIGURE 12 inverted for dispensing;

FIGURE 14 is top plan view of milk can cap;

FIGURE 15 is a perspective view of a fiber board carton, and insert adapted to receive a container liner and for dispensing;

FIGURE 16 is a sectional view of the carton of FIGURE 15, with a filled container, ready for shipment or storage;

FIGURE 17 is a fragmentary perspective view of the top of a sealed carton;

FIGURE 18 is a fragmentary perspective view of the top of a sealed carton broken open, with the hose exposed;

FIGURE 19 is a fragmentary perspective view of an alternate top of sealed carton with end flap broken away;

FIGURE 20 is a fragmentary perspective view of the form of FIGURE 19 further opened and with the hose exposed;

Figure 21:
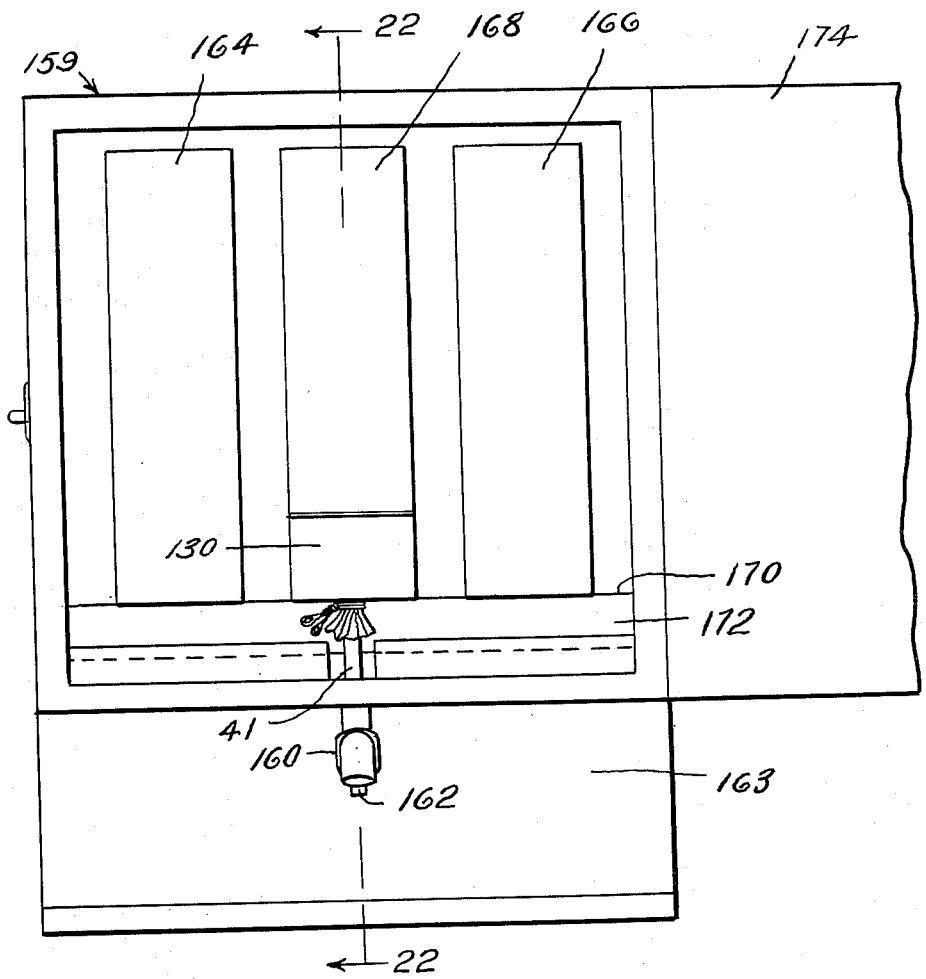
FIGURE 21 is a front elevational view of a dispenser cabinet, with door open, showing the dispensing package in place.

Referring to the drawings and more particularly FIGURES 1–4 there are shown plastic bags formed of tubular sheet plastic such as polyethylene. In FIGURE 1, a section of the tubular material 30, is heat sealed across the bottom as at 32, by passing a hot iron there across. In FIGURE 2, a similar section of the tubular material 34 is heat sealed across the bottom as at 36, and partially heat sealed across the top as at 38, the bag being left open as at 39 for filling. The form of bag shown in FIGURE 1 is adapted, after filling, to be gathered as at 40 around an outlet tube 41 and a wire tie 42 applied, the outlet tube being centrally located in respect to the upper end of the bag. In the form shown in FIGURE 4, the bag of FIGURE 2, is employed, the bag corner being gathered, after the bag is filled, about the outlet tube 44, and a wire tie 46 being applied. In gathering the end of the bag of FIGURE 1, it will be appreciated that the bag is of sufficient length, so that after filling with the desired quantity of liquid, there will be sufficient free material to permit the gathering as shown in FIGURE 3. The arrows A in FIGURE 1 indicate the region of gathering which becomes the approximate location for the tie when gathered. In the case of the bag shown in FIGURE 2, gathering is effected along a slant as is indicated by the arrows B, B, the gathered region embracing the seam 38, so that such seam will extend through the gathered region and into the rosette 48 of gathered material, beyond the tie 46. Less material will be gathered in the rosette where the seal is made on the slant in this manner.

In FIGURES 5 and 6, the gathered material 50 is shown embracing a relatively stiff tube 52, capable of withstanding the pressure of the wire tie 54, so that the plastic gathered material of the bag may be tightly compressed against the tube by the wire tie. Such tube in practice may be as large as an inch in external diameter, and the end provided with a plastic cork 56. The wire tie will preferably wrap the gathered material with two turns, and the ends, thereafter twisted to apply pressure.

In FIGURES 7–10 inclusive which are somewhat enlarged, the bag is gathered and tied about a relatively flexible plastic tube which in practice may have an external diameter of a half inch. In order to prevent the tube 58 from collapsing, the tube may be provided with a short internal sleeve 60 of rigid plastic, which will expand the tube 58 slightly upon insertion. The tube 58, with the sleeve is then well adapted to receive the gathered material 62 and pressure imposed thereon by the wire tie 64. As shown in FIGURE 8, the tube 58 may be fitted with an external sleeve 66 of stiff plastic, such sleeve contracting the tube 58 slightly, following which the bag material is gathered and securely compressed by the wire tie 68. If desired, the contacting area of the sleeve 66 and tube 58 may be provided with adhesive to assure against leakage of slippage, although in practice such precaution has been found, in general, to be unnecessary.

As is shown in FIGURES 9 and 10, the flexible tubes will be prepared in advance, in suitable lengths, the tube 58 being either provided with an internal sleeve 60 as shown in FIGURE 9, or an external sleeve 66 as shown in FIGURE 10. Such lengths may be provided with a suitable plug 70.

In FIGURE 11, the wire tie and gathered material is shown in some detail. The wire tie comprises two turns 72 and 74, the ends of which are twisted tightly to draw the loops or turns 72 and 74 with radial pressure upon the gathered bag material 80 upon the tube 82. The wire may be of 16 B&S guage, and of tinned or galvanized iron or stainless steel. The wire ends are provided with loops 84 and 86 to facilitate the twisting operation, such loops being of a size to be received by the hook or hooks of a twisting tool. In commercial practice, lengths of wire with a loop at each end and long enough to form two turns with additional length for the twist, will be supplied together with the bags, as shown in FIGURES 1 or 2. Likewise tubes suitably prepared, as in FIGURES 5, 9 or 10 will be supplied. It is to be understood that the rosette of gathered material indicated in FIGURES 5, 8 and 11 may be either that indicated in FIGURES 3 or 4. The twisted ends may be bent to lie along the length of the tube. While assembly of the outlet tube to the bag after filling, has been indicated as desirable, it is obvious that a bag with tube attached may be filled, in the same manner as described hereinafter in respect to larger diameter rigid tubes (see FIGURES 5 and 6).

In FIGURE 12, the bag of FIGURE 3 is shown as a liner in a container such as a standard milk can 90. The tubular material of which the bag is formed has a sufficient perimetral dimension so as to somewhat exceed the internal diameter of the can, so that the material will not be subjected to stress when placed within a can, and filled with liquid. Further, the bag is of sufficient length, so that the ends may gather and bear directly against the can bottom 92, as well as the can shoulder 94 for support of the contents within the bag, when the can is inverted, as for dispensing. Within the neck 96 of the can, the flexible tube 41 may be coiled, such neck portion forming a convenient sanitary storage area for the tube during shipment. The can cover 98 may be of standard form, but provided with an access aperture 99, preferably eccentrically located as shown in FIGURE 14. Such aperture may be provided with a suitable cap to prevent entrance of dirt, or may be covered by strip of adhesive sealing tape or otherwise as is indicated at 100.

In practice, an ordinary milk can of five gallons, or other size will be provided with a bag liner, as shown in FIGURE 1, the bag being placed within the can, with the open end slightly gathered and projecting above the shoulder and through and into the can neck 96. When so placed, the bag is filled with the desired quantity of fluid, the bag end then gathered about one end of a hose length fitted with a plug at its other end, and the wire tie applied. Thereafter the hose is coiled in the can end, and the cover applied. The can is then ready for shipment.

Upon arrival at its destination, the seal or cover 100 is removed, the hose brought out through the aperture 99, a pinch valve 102 applied, the can inverted (see FIGURE 13) and set on supports 103, after which the hose end beyond the pinch valve is cut off, or the plug removed. Dispensing at will may then commence. It will be appreciated that the order of performing the foregoing operations at the destination may be altered, as for example, the can inverted, and the hose subsequently drawn through the opening 99 and thereafter provided with a pinch valve. It will be readily appreciated that smooth flow from the hose will always be had, since as the liquid is withdrawn, the bag gradually collapses. No air gains admission to the bag during dispensing, and the contents thus remain sealed from outside air during the entire dispensing operation. Air of course enters the can along the can side walls, to permit the collapse of the liner or bag, but such air entry does not disturb the steady dispensing flow and cannot contaminate the liquid sealed within the bag. It has been found in practice that the bag is adequately supported by the annular shoulder 94 of the can until substantially the last drop of fluid is drawn therefrom, and the gathered material at the rosette as indicated at 105 forms a funnel, effective to drain off the entire contents.

Figure 22:
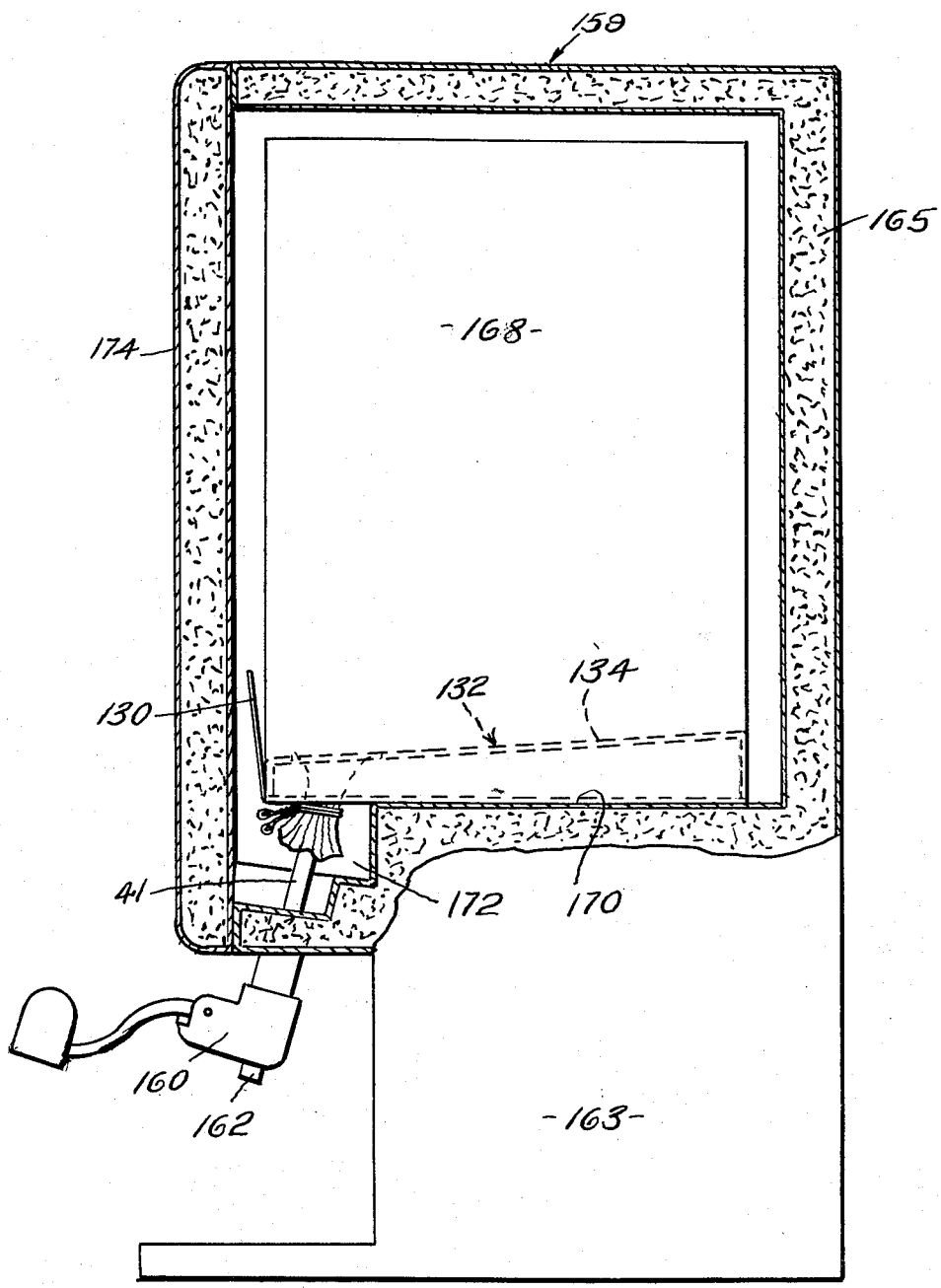
FIGURE 22 is a sectional view substantially on the line 22—22 of FIGURE 21.

In practice, where the cans are employed to ship milk or ice cream mix or the like, the cans may be placed in inverted position within a cooling cabinet, (such as is shown in FIGURES 21 and 22), the cabinet being fitted with an opening in the lower wall, through which the hose may extend to a dispensing pinch valve or the like. It will be seen from the foregoing, that the milk can itself requires no alteration from a standard can, and that such can is never in contact with the liquid contents, and thus the can can be expected to last forever, and will require only superficial cleaning from time to time and thus avoid expensive retinning. The only change required in the can cover, is the formation of the aperture 99, and either the provision of a removable cap, or the application of a strip of sealing tape to protect the can from foreign matter.

In FIGURES 15–20, the bag liner is shown as applied to containers in the form of corrugated board cartons. The carton shown is of a shape suitable to contain 10 quarts, although larger or smaller cartons of square or other cross section may be employed as desired. The carton comprises the usual rectangular section tube 110 which can be supplied flat, as is understood in the art. the carton has bottom longitudinal flaps 112, and end flaps 114. When the carton is expanded or, erected to the shape as shown, with the bottom flaps closed, a strip of adhesive tape may be applied around the bottom as is shown at 116. The upper longitudinal flaps 118 and 120, may have a triangular corner removed at one end, as indicated at 122, or may be scored as at 124 (FIGURES 19 and 20), to facilitate bending of the corners 126 outwardly as indicated and to provide access to the tube end. The end flap 128 will preferably be adapted to be folded inside the longitudinal flaps 118 and 120, while the end flap 130 will be folded external of the longitudinal flaps 118 and 120. The flap 130 will be of adequate length to cover the aperture formed by the removed corners of the longitudinal flaps 118 and 120 or the scored portions.

An insert or flanged deck 132 will be formed from corrugated board material for insertion into the upper end of the carton to form a shoulder means to support the bag, when the package is inverted. Such insert will have a rectangular deck 134, and side flanges 136 and 138, and end flanges 140 and 142, folded from the insert blank. An aperture 144 will be cut in the deck adjacent one end, or elsewhere as may be found convenient, such as in a corner, should a square section carton be employed. The side flanges 136 and 138 may be tapered if desired, that is, made wider adjacent the flange 142, so that the deck when placed within the carton will be slightly inclined, the aperture end thereof being closer to the carton end, for reasons as will hereinafter appear.

A bag liner 34 is placed within the carton, preferably of the type shown in FIGURE 2, and after filling, such liner is sealed as in FIGURE 4 by the gathering of the material about a tube end, the insert 132 positioned within the end of the carton with the tube extending through the aperture. Thereafter the end flap 128 will be closed, and the longitudinal flaps 118 and 120 closed, and a strip of adhesive tape 150 applied, following which the end flap 130 is closed and a strip of adhesive tape 152 applied. In placing the insert in the box, the hose and rosette are extended through the aperture 144, and the hose 41 coiled in the space between the deck and the carton end.

The carton and its contents are ready for shipment, which will be refrigerated, if the contents are milk or other liquid requiring refrigeration. When the carton is employed for milk, and received at its destination, the end flap 130 is released by cutting or removing the tape 152 or releasing the tape ends, the hose 41 extracted through the opening provided by the removed portions at 122 of the longitudinal flaps 118 and 120, or by bending up the corners 126, after which the package can be inverted and set in a cooling cabinet 159, as shown in FIGURE 21. Such a cabinet has insulated walls 165, and a refrigerating unit in the base 163 thereof for maintaining a temperature of approximately 34° F. The hose is extended through a pinch valve 160, and the lower end with its plug cut off as at 162 as by using a sanitary clean razor blade.

Where a cooling cabinet of adequate size to store a number of such cartons is provided, the cartons such as 164 and 166 are stored on either side of the center carton 168. In such cabinets, the floor of the cabinet 170 may be provided with an offset as indicated at 172, providing room for detaching the tape 152 so that the flap 130 can be released and moved back to the position shown. Adequate space is also thus provided for quickly and easily reaching into the space between the deck and the inverted carton end to extract the free end of the tube and thereafter thread the end thereof through the pinch valve. The cartons can be slid forward slightly, when the door 174 is opened, to facilitate such operation. In practice, the cartons can be opened before placing them in the cabinet, and the hose can be extracted and allowed to lie in the offset 172, until the central carton is emptied and removed, after which a side carton is moved to the center, and the hose thereof then threaded through the pinch valve 160, after which the plug end is cut off, as by a sanitary razor blade.

The cabinet size will be slightly larger than the cartons' height and longitudinal width, so as to provide circulation for effective cooling, and in practice the cartons will be spaced slightly within the cabinet and from the cabinet end walls for the same reason.

In FIGURE 22, the deck 134 is indicated as sloping slightly by reason of the use of tapered flanges 136 and 138 as heretofore referred to, and when such slope is provided, substantially complete drainage of the bag within is more easily effected. It will be seen that as soon as the hose is withdrawn from the carton and extended into the pinch valve, that the rosette 48 will extend downward, and the portion of the gathered bag above the wire tie 46, will act as a funnel, integral with the bag material, and will promote together with the sloping deck, complete emptying of the bag. The upper rim of the funnel thus formed will be sustained by the aperture in the deck, the remainder of the deck will act as a shoulder support for the bag and contents. The pressure on the rosette, or the funnel portion referred to, by reason of the weight of the liquid will cause the gathered material to assume the funnel-like shape, as soon as the carton is up-ended, and the hose drawn downwardly from the compartment formed by the deck insert.

The bags may be formed of polyethylene as thin as two or three thousandths of an inch thickness. In gathering suchmaterial about the outlet tube, and tying the same with the two wire loops, it would normally be expected that the folds might fail to provide a liquid tight seal between the bag and tube. However, in practice the relatively non-wettable nature of the polyethylene in respect to the liquids contained therein acts to prevent leakage. Also the nature of some liquids such as milk and the like are inherently self-sealing. Despite the foregoing, it has been found in practice that the seal set forth between the tube and bag is effective and leak-proof.

The can shoulder, or the deck member of the box, in either case constitutes a shoulder means to support the bag and its contents when inverted and during dispensing, and the can neck, and the region above the deck likewise provide a storage area during shipment in which the outlet tube can be nested. Where the outlet tube is stiff, the material of the bag adjacent the rosette offers sufficient flexibility so that such tube may lie within the space afforded above the deck or shoulder means, or such tube may be projected a substantial distance into the container below the shoulder means so as to be enclosed within the carton or container during shipment.

Where a stiff tube is employed, its diameter may be sufficient for filling after attachment to the open end of the bag in the manner described, and dispensing may be accomplished by tipping the carton or container, and using the tube as a pour spout, the shoulder means in any event acting as a sustaining means to prevent the contents containing portion of the bag from slipping out of the container, or beyond the shoulder means, when the carton or container is tilted, as for example in pouring the remaining contents from the bag. The liquid within the bag maintains the bag expanded at the dispensing end so as to assure support upon the shoulder means whenever the carton or container is inverted or tilted toward the inverted position.

While mention has been made as to the advantages of the package in respect to the distribution of milk and milk products, it should be at once evident that the package may be employed for shipping of any liquids such as fruit juices, beverages and the like, as well as commercial liquids such as corrosive liquids, which heretofore have required special consideration and where ease of dispensing is of importance.

It will be seen that in the practice of the invention, the materials required are cartons, which may be shipped in collapsed form, bags which may be prepared in quantity in advance and shipped flat, tube lengths, and sealing wires, all of which are low in cost, and easily assembled at the source where packaging is to take place. While sealing wires have been described, it will appear that any banding method may be employed, or the bag material may be gathered about the tube under radial pressure and sealed by heat, cohesive or other means.

It will also be seen that in the case of milk distribution, a ten quart package or carton weighing but 20 pounds, is within the weight limit which can be handled by the ultimate consumer, so that milk, for example, can be packaged at its source, and thereafter dispensed at its ultimate point of consumption. It will be appreciated that the ultimate consumer with modern refrigeration facilities may reduce the frequency of delivery of such packages, and eliminate the nuisance in respect to the handling of numerous quart containers, whether of the disposable or returnable variety. In addition it can be readily appreciated that the necessity for inspection, and care ordinarily required for sanitary distribution is substantially eliminated or reduced.

While several forms of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A method of packaging a liquid which comprises placing an open ended thin wall relatively inelastic flexible tubular liner sealed at its lower end within a rigid open ended container, dispensing a quantity of liquid into said liner, to a level substantially below the upper end portion of the liner and the upper end of the container, gathering the upper end portion of the liner about the end of an outlet tube of relatively small diameter as compared to said tubular liner, and circumferentially banding the gathered end portion about the end of the outlet tube under radial compression to form a liquid seal therebetween.

2. A liquid dispensing and shipping package comprising a substantially rigid sustaining container, a thin wall plastic liquid tight liner composed of tubular sheet material in the form of an open top bag having a perimetral dimension at least as great as the internal perimetral dimensions of the container and having a length substantially in excess of the length of the container whereby the liner when filled bears against the container walls without stress, an outlet tube, said liner being gathered at its upper end about one end of said outlet tube to form a rosette, a circumferentially tensioned double loop of wire extending around said gathered end holding said gathered sheet material radially compressed against the outer wall of said outlet tube to form a liquid tight seal between the bag and tube, said container having within its upper end sustaining inwardly extending shoulder means located below the upper end of the container, said shoulder means providing a compartment thereabove for the other end of said tube during shipment, a cover for the upper end of said container having access means through which to extract the other end of said tube from said compartment, said liner being adapted to be filled with liquid to a level below said shoulder means prior to shipment, and said shoulder means in said container closing off the upper end of the container sufficiently whereby, when the container is inverted, said shoulder means provides adequate support for the liner and its contents, except in the region of said rosette whereby the bag material adjacent the seal forms a drainage funnel, when so inverted.

3. A liquid dispensing and shipping package comprising a substantially rigid sustaining container, a thin wall plastic liquid tight liner composed of tubular sheet material in the form of an open top bag having a perimetral dimension at least as great as the internal perimetral dimensions of the container and having a length substantially in excess of the length of the container whereby the liner when filled bears against the container walls without stress, an outlet tube, said liner being gathered at its upper end about one end of said outlet tube to form a rosette, and said outlet tube projecting into said open end, banding means extending around said gathered end and adapted to radially compress said gathered end against the outer wall of said outlet tube to form a liquid tight seal between the bag and tube, said container having within its upper end sustaining inwardly extending shoulder means located below the upper end of the container, said shoulder means providing a compartment thereabove for the other end of said tube during shipment, a cover for the upper end of said container having access means through which to extract the other end of said tube from said compartment, said liner being adapted to be filled with liquid to a level below said shoulder means prior to shipment, and said shoulder means in said container closing off the upper end of the container sufficiently whereby, when the container is inverted, said shoulder means provides adequate support for the liner and its contents, except in the region of said rosette whereby the bag material adjacent the seal forms a drainage funnel, when so inverted.

4. A sanitary liner for retaining liquid in a relatively rigid container comprising a bag in the form of a tubular member formed of thin wall liquid tight flexible plastic sheet material of relatively uniform tubular section along its length, said tubular member having a seal extending transversely across the lower end thereof, and a seal extending transversely across the other upper end thereof part way to provide a corner end opening, a single flexible tube having one end projecting into said end opening, said tube having a circular outer wall surface, said sheet material of the bag including a portion of said seal adjacent said end opening being tightly gathered about said tube, and banding means disposed around said gathered material including a portion of said upper seal and lying in a plane extending across the corner end opening of said tubular material diagonally with respect to the upper seal thereof to apply circumferential inwardly directed radial pressure for retaining said gathered material around the one end of said tube and against the outer wall thereof to form a liquid tight seal between the gathered tubular material of the bag and the tube, the other end of said tube projecting beyond the tubular material.

5. A sanitary liner for retaining liquid in a relatively rigid container comprising a bag in the form of a tubular member formed of thin wall liquid tight flexible plastic sheet material of relatively uniform tubular section along its length, said tubular member having a seal extending transversely across the lower end thereof, and a seal extending transversely across the other upper end thereof part way to provide a corner end opening, a single flexible tube having one end projecting into said end opening, said tube having a circular outer wall surface, said sheet material of the bag including a portion of said seal adjacent said end opening being tightly gathered about said tube, and banding means disposed around said gathered material including a portion of said upper seal and lying in a plane extending across the corner end opening of said tubular material diagonally with respect to the upper seal thereof for retaining said gathered material around the one end of said tube and against the outer wall thereof to form a liquid tight seal between the gathered tubular material of the bag and the tube, the other end of said tube projecting beyond the tubular member, and said banding means comprising a length of wire looped twice around said gathered material, said length having its ends twisted together.

6. A sanitary liner for retaining liquid in a relatively rigid container comprising a bag in the form of a tubular member formed of thin wall liquid tight flexible plastic sheet material of relatively uniform tubular section along its length, said tubular member having a seal extending transversely across the lower end thereof, and a seal extending transversely across the other upper end thereof part way to provide a corner end opening, a single flexible tube having one end projecting into said end opening, said tube end having an internal rigid sleeve for rigidifying the tube end against radial collapse, said tube having a circular outer wall surface, said sheet material of the bag including a portion of said seal adjacent said end opening being tightly gathered about said tube, and banding means disposed around said gathered material including a portion of said upper seal and lying in a plane extending across the corner end opening of said tubular material diagonally with respect to the upper seal thereof to apply circumferential inwardly directed radial pressure for retaining said gathered material around the one end of said tube and against the outer wall thereof to form a liquid tight seal between the gathered tubular material of the bag and the tube, the other end of said tube projecting beyond the tubular material.

7. A sanitary liner for retaining liquid in a relatively rigid container comprising a bag in the form of a tubular member formed of thin wall liquid tight plastic sheet material of relatively uniform tubular section along its length, said tubular member having a seal extending transversely across one end thereof, and a seal extending transversely across the other upper end thereof part way to provide a corner end opening, a single flexible tube having one end projecting into said end opening, said tube end having an internal rigid sleeve for rigidifying the tube end against radial collapse, said tube having a circular outer wall surface, said sheet material of the bag including a portion of said seal adjacent said end opening being tightly gathered about said tube, and banding means disposed around said gathered material including a portion of said upper seal and lying in a plane extending across the corner end opening of said tubular material diagonally with respect to the upper seal thereof for retaining said gathered material around the one end of said tube and against the outer wall thereof to form a liquid tight seal between the gathered tubular material of the bag and the tube, the other end of said tube projecting beyond the tubular member, and said banding means comprising a length of wire looped twice around said gathered material, said length having its ends twisted together.

References Cited in the file of this patent

UNITED STATES PATENTS

| | | |
|---|---|---|
| 390,643 | Blincoe | Oct. 9, 1888 |
| 956,077 | Greenfield | Apr. 26, 1910 |
| 1,309,819 | Shepard | July 15, 1919 |
| 2,015,653 | Andrews | Oct. 1, 1935 |
| 2,050,812 | Schweitzer | Aug. 11, 1936 |
| 2,329,490 | Smith | Sept. 14, 1943 |
| 2,446,308 | Smith | Aug. 3, 1948 |
| 2,520,335 | Piazze | Aug. 29, 1950 |
| 2,562,389 | Piazze | July 31, 1951 |
| 2,689,076 | Jenkins | Sept. 14, 1954 |
| 2,861,718 | Winzen | Nov. 25, 1958 |

FOREIGN PATENTS

| | | |
|---|---|---|
| 866,288 | France | July 21, 1941 |
| 1,021,478 | France | Feb. 19, 1953 |